(12) United States Patent
Oohata (10) Patent No.: US 11,397,250 B2
(45) Date of Patent: Jul. 26, 2022

(54) DISTANCE MEASUREMENT DEVICE AND DISTANCE MEASUREMENT METHOD

(71) Applicant: Sony Corporation, Tokyo (JP)

(72) Inventor: Toyoharu Oohata, Tokyo (JP)

(73) Assignee: Sony Corporation, Tokyo (JP)

( * ) Notice: Subject to any disclaimer, the term of this patent is extended or adjusted under 35 U.S.C. 154(b) by 425 days.

(21) Appl. No.: 16/098,054

(22) PCT Filed: Apr. 10, 2017

(86) PCT No.: PCT/JP2017/014609
§ 371 (c)(1),
(2) Date: Oct. 31, 2018

(87) PCT Pub. No.: WO2018/003227
PCT Pub. Date: Jan. 4, 2018

(65) Prior Publication Data
US 2019/0154815 A1    May 23, 2019

(30) Foreign Application Priority Data

Jun. 27, 2016 (JP) .............................. JP2016-126997

(51) Int. Cl.
*G01C 3/08* (2006.01)
*G01S 7/486* (2020.01)
*G01S 17/10* (2020.01)
*G01C 3/06* (2006.01)
*G01S 17/18* (2020.01)

(52) U.S. Cl.
CPC .............. *G01S 7/4868* (2013.01); *G01C 3/06* (2013.01); *G01S 17/10* (2013.01); *G01S 17/18* (2020.01)

(58) Field of Classification Search
CPC ........ G01S 17/18; G01S 17/10; G01S 7/4868; G01C 3/06
See application file for complete search history.

(56) References Cited

U.S. PATENT DOCUMENTS 5,198,657 A      3/1993  Trost et al.
7,301,608 B1 *  11/2007  Mendenhall ............ G01S 17/18
                                                       356/4.01
8,194,126 B2    6/2012  David et al.
(Continued)

FOREIGN PATENT DOCUMENTS

JP    H09211108 A  *  8/1997  ............... G01S 7/48
JP    10-153417         6/1998
(Continued)

OTHER PUBLICATIONS

Extended European Search Report filed Apr. 11, 2019 in corresponding European Application No. 17819595.4.
(Continued)

*Primary Examiner* — Mark Hellner
(74) *Attorney, Agent, or Firm* — K&L Gates LLP (57) ABSTRACT

Disclosed is a distance measurement device including a control section. The control section executes control so that an operating voltage for operating a light-receiving section is applied to the light-receiving section at a second time point. The second time point is later than a first time point by a predetermined time. The first time point is a time point at which a light-emitting section operates.

9 Claims, 7 Drawing Sheets (56) References Cited

U.S. PATENT DOCUMENTS

| | | | |
|---|---|---|---|
| 2006/0170903 A1* | 8/2006 | Aburmad | G01S 17/14 |
| | | | 356/5.06 |
| 2007/0058038 A1* | 3/2007 | David | G01S 17/18 |
| | | | 348/135 |
| 2012/0075615 A1 | 3/2012 | Niclass et al. | |
| 2012/0113410 A1* | 5/2012 | Iwasawa | G01S 17/42 |
| | | | 356/5.01 |
| 2015/0177369 A1 | 6/2015 | Kostamovaara | |
| 2015/0355326 A1* | 12/2015 | Smith | G01S 7/481 |
| | | | 356/5.01 |
| 2016/0259058 A1* | 9/2016 | Verheggen | G01S 7/4868 |
| 2019/0178996 A1* | 6/2019 | Nomura | G01S 7/497 |

FOREIGN PATENT DOCUMENTS

| | | |
|---|---|---|
| JP | H10-153417 A | 6/1998 |
| JP | 2007-078424 | 3/2007 |
| JP | 2007-078424 A | 3/2007 |
| JP | 2015-117970 | 6/2015 |
| JP | 2015-117970 A | 6/2015 |

OTHER PUBLICATIONS

International Search Report and Written Opinion issued in connection with International Patent Application No. PCT/JP2017/014609, dated Jun. 27, 2017. (13 pages).

* cited by examiner

DISTANCE MEASUREMENT DEVICE AND DISTANCE MEASUREMENT METHOD

CROSS-REFERENCE TO RELATED APPLICATIONS

The present application claims the benefit of International Application No. PCT/JP2017/014609, filed Apr. 10, 2017, which claims priority to Japanese Application No. 2016-126997, filed Jun. 27, 2016, the disclosures of which are incorporated herein by reference.

BACKGROUND

The present disclosure relates to a distance measurement device and to a distance measurement method.

Distance measurement devices for measuring the distance to a measurement target have been known in related art (refer, for example, to PTL 1 below).

SUMMARY

Technical Problem

In the above-mentioned field, it is desired that the accuracy of distance measurement be improved.

Accordingly, an object of the present disclosure is to provide a distance measurement device and a distance measurement method that improve the accuracy of distance measurement.

Solution to Problem

In order to solve the above problem, according to one aspect of the present disclosure, there is provided a distance measurement device including a control section. The control section executes control, for example, to apply an operating voltage for operating a light-receiving section to the light-receiving section at a second time point. The second time point is later than a first time point by a predetermined time. The first time point is a time point at which a light-emitting section operates.

According to another aspect of the present disclosure, there is provided a distance measurement method. The distance measurement method executes control so that an operating voltage for operating a light-receiving section is applied to the light-receiving section at a second time point. The second time point is later than a first time point by a predetermined time. The first time point is a time point at which a light-emitting section operates.

Advantageous Effect of Invention

At least one of the aspects of the present disclosure is able to improve the accuracy of distance measurement. It should be noted that the advantage described here is not necessarily restrictive. It is to be understood that any advantages described in this document are provided by the present disclosure. Further, the interpretation of the present disclosure is not restricted by exemplified advantages.

DETAILED DESCRIPTION

Embodiments and examples of the present disclosure will now be described with reference to the accompanying drawings. It should be noted that the description is given in the following order.

<1. An Embodiment>
<2. Modification Examples>
<3. Application Examples>

The embodiments and examples described below are preferred concrete examples of the present disclosure. The present disclosure is not limited to such embodiments and examples.

1. An Embodiment

[Exemplary Configuration of Distance Measurement Device]

Figure 1:
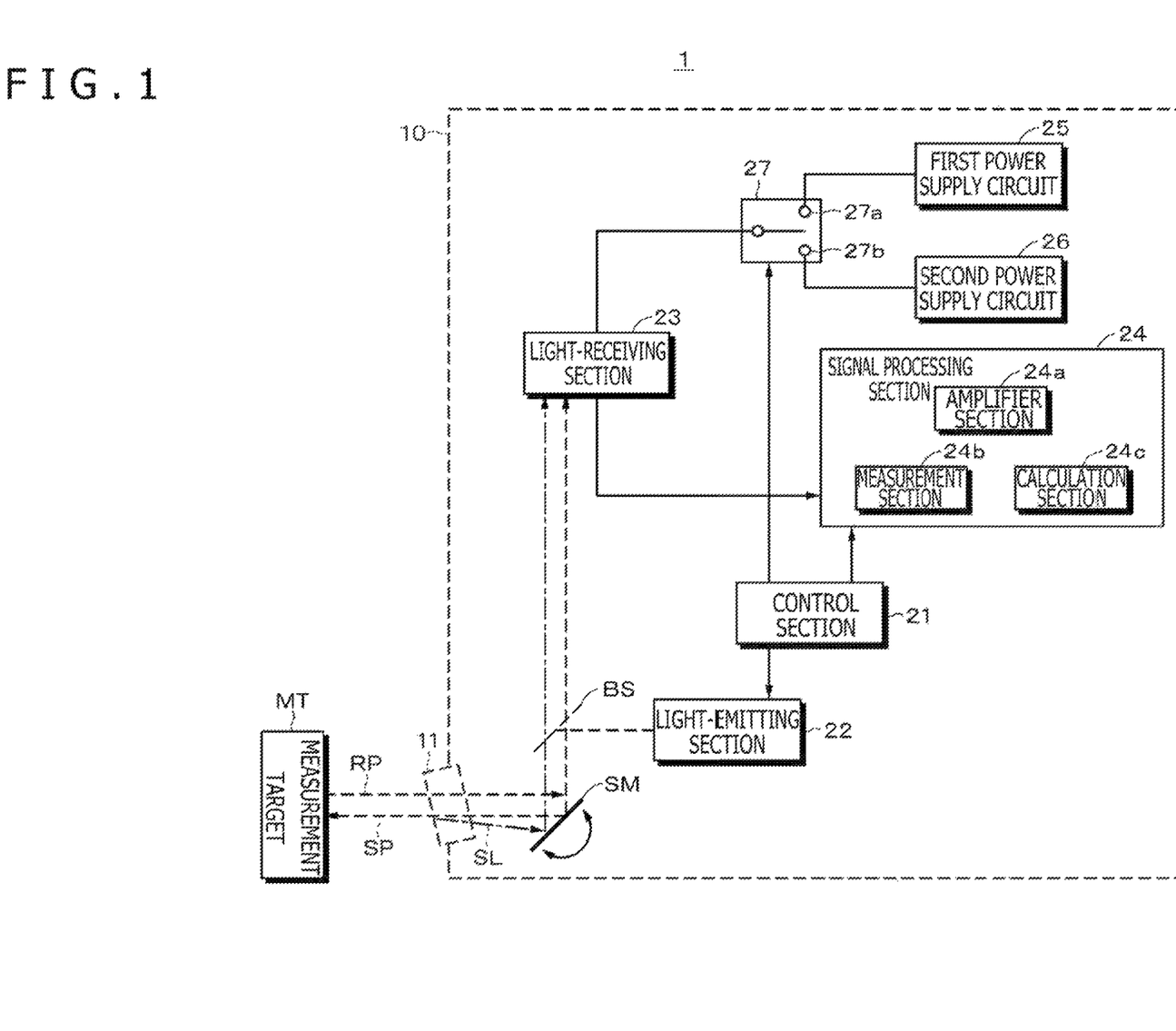
FIG. 1 is a block diagram illustrating an exemplary configuration of a distance measurement device according to an embodiment of the present disclosure.

FIG. 1 illustrates an exemplary configuration of a distance measurement device (distance measurement device 1) according to an embodiment of the present disclosure. The distance measurement device 1 is, for example, a device to which the TOF (Time Of Flight) method is applied. The TOF method is a distance measurement method. An example of the TOF method is schematically explained below. The TOF method irradiates a measurement target, which is a distance measurement target, with pulsed light (hereinafter referred to, as appropriate, as the standard pulsed light) that is used as standard light (reference light). The standard pulsed light is reflected from the measurement target so that the resulting reflected pulsed light (hereinafter referred to, as appropriate, as the reflected pulsed light) is received by a light-receiving section. The time required between the instant at which the standard pulsed light is emitted and the instant at which the reflected pulsed light is received by the light-receiving section corresponds to the time of flight of light. This time of flight is multiplied by the speed of light c (m/s), and then the result of multiplication is multiplied by ½ to calculate the distance to the measurement target. The above is an example of the TOF method.

The distance measurement device 1 according to the present embodiment houses various parts in a housing (housing 10) in consideration of use in various outdoor environments and in order for the protection and antifouling, for example, of optical parts and a scanning mirror. The housing 10 may have a box-like shape, a cylindrical shape, or any other shape. The housing 10 need not always form a closed space, but may be partially open. The housing 10 has an optical window 11. The optical window 11 is formed so that light emitted from a later-described light-emitting section passes through the optical window 11. The light emitted through the optical window 11 falls on the measurement target MT, and the light reflected from the measurement target MT enters the housing 10 through the optical window 11. In order to reduce the reflection from the optical window 11, the optical window 11 is tilted approximately 5 to 10 degrees from the optical axis of emitted light.

Various sections in the housing 10 will now be described. The distance measurement device 1 includes a control section 21, a light-emitting section (which may be referred to as the light emitter) 22, a light-receiving section 23, a signal processing section 24, a first power supply circuit 25, a second power supply circuit 26, a switching circuit 27, a beam splitter BS, and a scanning mirror SM.

The control section 21 includes, for example, a CPU (Central Processing Unit), and controls the various sections of the distance measurement device 1. The control section 21 controls, for example, a time point at which the light-emitting section 22 emits light, and reports the time point to the signal processing section 24. Further, the control section 21 executes, for example, switching control by controlling the switching circuit 27.

The light-emitting section 22 includes, as light source elements, for example, a pulse laser diode and a driver for driving the pulse laser diode (these elements are not depicted). The driver operates under the control of the control section 21. This causes the pulse laser diode to emit the standard pulsed light SP. For example, the light-emitting section 22 emits the standard pulsed light SP with a wavelength of approximately 830 nm (nanometers) and a full width at half-maximum of 300 ps (picoseconds) or less at a repetition rate of 10 MHz (megahertz).

The light-receiving section 23 receives the reflected pulsed light RP, which enters the housing 10 through the optical window 11 subsequently to the reflection of the standard pulsed light SP from the measurement target MT. The light-receiving section 23 will be described in detail later.

The signal processing section 24 includes functional blocks such as an amplifier section 24a, a measurement section 24b, and a calculation section 24c. The amplifier section 24a is a circuit that linearly amplifies a voltage outputted from the light-receiving section 23 at a predetermined amplification factor. The measurement circuit 24b is a circuit that measures a light-receiving time point at which the reflected pulsed light RP is received by the light-receiving section 23 by detecting an edge point at which a voltage outputted from the amplifier section 24a reaches a predetermined threshold value $V_{th}$. The measurement section 24b outputs the measured light-receiving time point to the calculation section 24c. The measurement section 24b in the present embodiment includes a time-to-digital converter (hereinafter referred to, as appropriate, as the TDC (Time Digital Converter) that converts the measured time point to a digital value and then outputs the digital value.

The calculation section 24c includes, for example, a microcomputer and an FPGA (Field Programmable Gate Array). Based on the time point at which the light-emitting section 22 emits light (operates) and on the light-receiving time point measured by the measurement section 24b, the calculation section 24c calculates the distance to the measurement target MT. The distance to the measurement target MT is calculated, for example, by determining the difference between the time point of light emission from the light-emitting section 22 and the light-receiving time point, calculating the time of flight $T_{TOF}$ of the standard pulsed light SP emitted from the light-emitting section 22, multiplying the time of flight $T_{TOF}$ by the speed of light c, and multiplying the result of the above multiplication by ½. It should be noted that correction and other processes may be performed during the distance calculation process.

The first power supply circuit 25 is a constant-voltage circuit that supplies, for example, a DC voltage for operating the light-receiving section 23 (hereinafter referred to, as appropriate, as the operating voltage). The second power supply circuit 26 is a constant-voltage circuit that supplies, for example, a DC voltage that does not operate the light-receiving section 23 (hereinafter referred to, as appropriate, as the standby voltage). The first and second power supply circuits 25 and 26 may be a power storage element, such as a battery or a capacitor, or a circuit for rectifying the AC voltage, for example, of a commercial power supply. Further, the first and second power supply circuits 25 and 26 may include a circuit that has, for example, a capacitor in order to provide a stabilized voltage.

The switching circuit 27 includes a contact 27a and a contact 27b. The contact 27a is connected to the first power supply circuit 25. The contact 27b is connected to the second power supply circuit 26. A point to which a switch is connected is changed to the contact 27a or the contact 27b under the control of the control section 21. It should be noted that there may be a state where the switch is connected to neither the contact 27a nor the contact 27b.

The beam splitter BS causes an optical path to branch off. The beam splitter BS functions so that the standard pulsed light SP emitted from the light-emitting section 22 is directed to the optical window 11. Further, the beam splitter BS functions so that the reflected pulsed light RP reflected from the measurement target MT is directed to the light-receiving section 23.

The scanning mirror SM is a movable mirror such as a polygon mirror or a Galvano-scanner mirror. The scanning mirror SM scans the standard pulsed light SP, which is repeatedly emitted from the light-emitting section 22, for example, in two-dimensional directions, namely, in up-down and left-right directions. The scanning mirror SM makes it possible to make distance measurements over a wide range. It should be noted that the scanning mirror SM is not always necessary in a case where the distance to a single point is to be measured.

[Light-Receiving Section]

Figure 2:
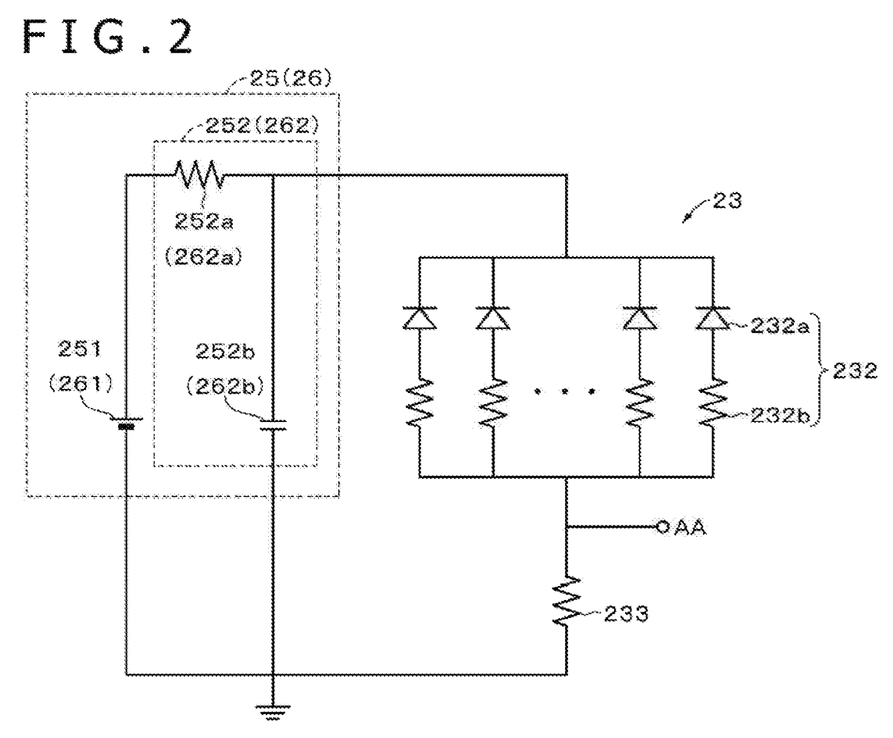
FIG. 2 is a diagram illustrating an exemplary configuration of a light-receiving section according to an embodiment of the present disclosure.

An example of the light-receiving section 23 will now be described. As an example of the light-receiving section 23, the present embodiment uses a multi-pixel SPAD (Single Photon Avalanche Diode). As illustrated in FIG. 2, the light-receiving section 23 includes a plurality of light-receiving elements 232. The light-receiving elements 232 each include an avalanche photodiode 232a and a quenching resistor 232b. The quenching resistor 232b is series-connected to the avalanche photodiode 232a. That is, the light-receiving section 23 is configured (multi-pixel configuration) so that one light-receiving element (one SPAD) 232 is regarded as a base unit and that a plurality of the light-receiving elements 232 are two-dimensionally connected (e.g., connected in parallel).

Further, the light-receiving section 23 includes a resistor 233 that is connected to the output side of the light-receiving section 23. The resistor 233 operates so that a current signal outputted from the light-receiving section 23 is converted to a voltage signal. The signal processing section 24 disposed to follow the light-receiving section 23 is connected to a connection point AA between the light-receiving elements 232 and the resistor 233. Thus, the voltage signal outputted from the light-receiving section 23 is supplied to the signal processing section 24.

As described earlier, either one of the first and second power supply circuits 25 and 26 is connected to the light-receiving section 23. The first power supply circuit 25 includes, for example, a power supply 251 and a smoothing circuit 252. The power supply 251 operates so that the operating voltage for the light-receiving section 23 is applied to the light-receiving section 23. The smoothing circuit 252 includes a resistor 252a and a capacitor 252b, and stabilizes the power supply voltage. Meanwhile, the second power supply circuit 26 includes, for example, a power supply 261 and a smoothing circuit 262. The power supply 261 operates so that the standby voltage for the light-receiving section 23 is applied to the light-receiving section 23. The smoothing circuit 262 includes a resistor 262a and a capacitor 262b, and stabilizes the power supply voltage. It should be noted that the first and second power supply circuits 25 and 26 may differ in configuration.

An avalanche phenomenon occurring in the light-receiving section 23 will now be described. For the convenience of explanation, the following description is given with reference to one light-receiving element 232. However, a similar phenomenon occurs in the other light-receiving elements. If a photon is incident while a reverse voltage not lower than a breakdown voltage is applied to the avalanche photodiode 232a, the avalanche photodiode 232a generates an electron-hole pair. The electron and the hole are then accelerated in a high electric field to successively generate a new electron-hole pair in an avalanche manner. This phenomenon is called an avalanche phenomenon. It should be noted that the avalanche phenomenon may be referred to as avalanche amplification or avalanche multiplication. Upon receiving a single photon, the avalanche photodiode 232a causes avalanche multiplication and generates an avalanche current at a multiplication factor of $10^5$ to $10^6$. Meanwhile, if a photon is incident while a reverse voltage lower than the breakdown voltage is applied to the avalanche photodiode 232a, the avalanche phenomenon does not occur.

While the avalanche phenomenon occurs, that is, before the voltage applied to an internal depletion layer reverts to a measurable state subsequently to the output of a signal (hereinafter referred to, as appropriate, as the light-receiving signal), the avalanche photodiode 232a does not react even when another photon is received or exhibits low sensitivity to an optical input. This dead period (referred to also as the recovery period or recharge period) is a period when the level of the light-receiving signal represented, for example, by a waveform exponentially decreases to a predetermined level (e.g., threshold value $V_{th}$) or lower, and is generally within the range of several ns (nanoseconds) to several tens of ns.

The avalanche phenomenon can be stopped by decreasing the voltage applied to the avalanche photodiode 232a to the breakdown voltage. This function can be implemented by the quenching resistor 232b series-connected to the avalanche photodiode 232a. An increase in the voltage across the quenching resistor 232b, which is caused by the avalanche current, lowers a bias voltage and stops the avalanche current.

Figure 3:
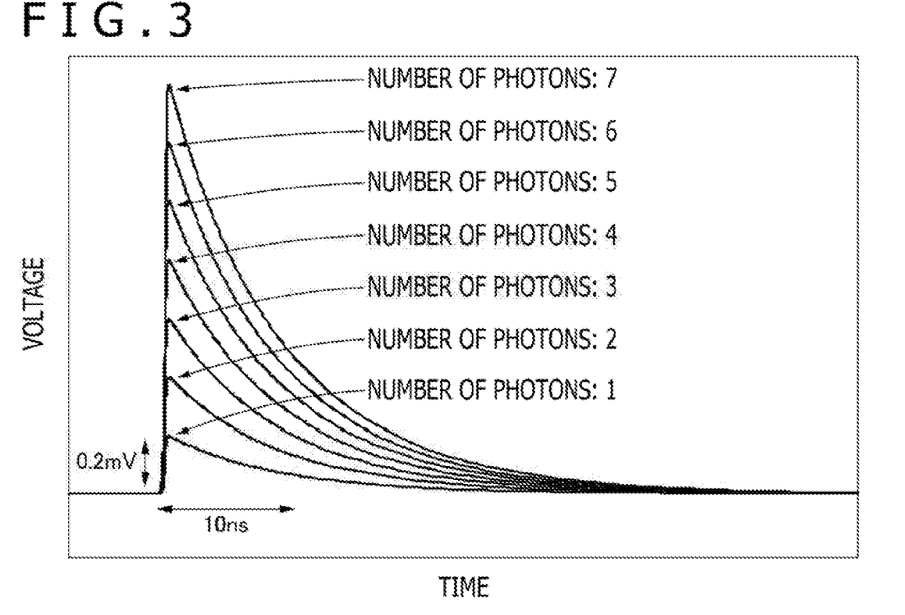
FIG. 3 is a diagram illustrating exemplary waves of a light-receiving signal outputted from the light-receiving section.

FIG. 3 illustrates ideal waves of the light-receiving signal outputted from the light-receiving section 23. In FIG. 3, the horizontal axis represents time, and the vertical axis represents voltage. It should be noted that actual waveforms are in a state where a pulsed or random noise waveform is superimposed over an illustrated waveform due, for instance, to a thermal factor.

The light-receiving signal from the light-receiving section 23 sharply rises upon receipt of a photon. The level of the light-receiving signal exponentially decreases after reaching the level of a peak voltage (hereinafter referred to, as appropriate, as the peak value). In the light-receiving section 23 to which a reverse bias voltage not lower than the breakdown voltage is applied, the avalanche photodiodes 232a in the individual light-receiving elements 232 simultaneously output a current pulse having a predetermined waveform and peak voltage upon detection of one photon at a time. The total current of all the light-receiving elements is then outputted from the output terminal of the light-receiving section 23. As this signal is allowed to pass through the resistor 233, the light-receiving signal from the light-receiving section 23 can be handled as a voltage signal.

As illustrated in FIG. 3, the peak value and an integral value derived from waveform integration are discretized based on the number of photons received by the light-receiving section 23. That is, the number of photons received by the light-receiving section 23 can be determined by acquiring the peak value of the light-receiving signal from the light-receiving section 23.

Figure 4:
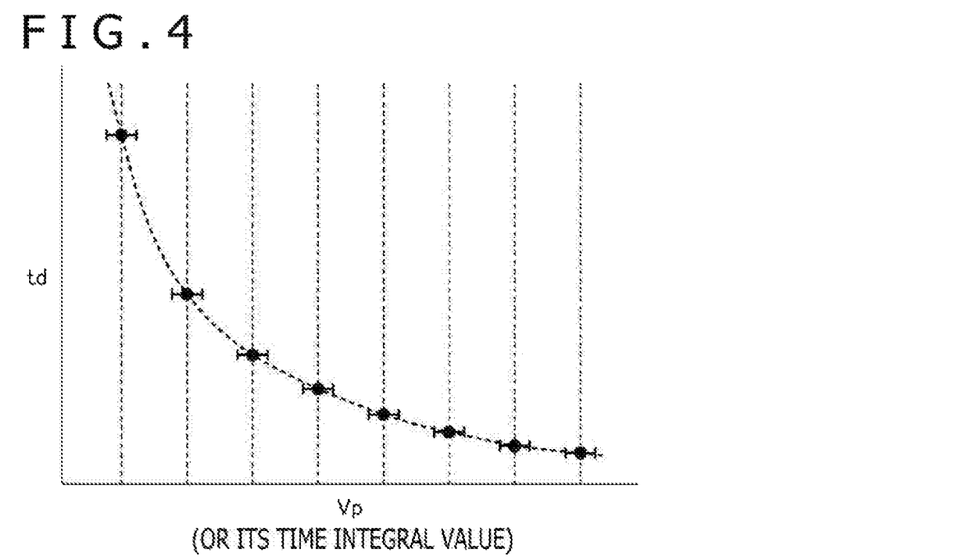
FIG. 4 is a diagram illustrating an exemplary relationship between the peak voltage and delay time of the light-receiving signal outputted from the light-receiving section.

FIG. 4 is a schematic diagram illustrating the relationship between the peak voltage Vp of the light-receiving signal and delay time td of detection of the threshold value $V_{th}$ from the beginning of rise of the light-receiving signal. In FIG. 4, the horizontal axis represents an integral value that is obtained by integrating the peak voltage of the light-receiving signal or the voltage of the light-receiving signal, which is discretized based on the number of received photons, and the vertical axis represents the delay time td. FIG. 4 indicates that the delay time td is also discretized in accordance with the discretization of the light-receiving signal. Further, FIG. 4 indicates that discretization intervals of the peak voltage Vp and its time-integrated value are constant in correspondence with an increase in the number of detected photons by one, and that the weaker the signal, the longer the discretization intervals of the delay time td.

Figure 5:
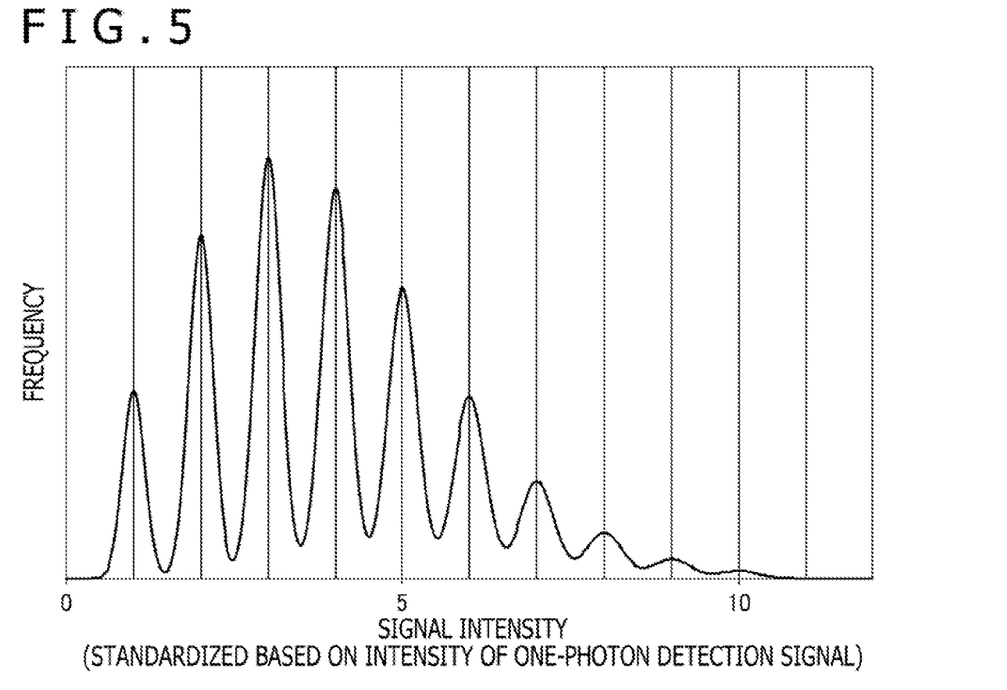
FIG. 5 is a diagram illustrating an exemplary measurement of the frequency distribution of an integral value at each pulse of the light-receiving signal outputted from the light-receiving section.

In reality, the light-receiving signal and its amplified signal contain thermal noise or other analog noise. However, such signals exhibit a high S/N ratio (Signal-to-Noise Ratio) due to current multiplication in the light-receiving element 232. Thus, the discretization intervals for different numbers of detected photons are greater values than the range of noise-induced signal fluctuation. Therefore, when the frequency distributions of the pulse peak value and integral value of the light-receiving signal are measured, a histogram having a local maximum value at a value corresponding to the number of detected photons is obtained as indicated in FIG. 5.

That is, in a case where, for example, a multi-pixel SPAD is used as the light-receiving section 23, a signal having a high S/N ratio can be obtained even if a weak light is received. Further, the light-receiving signal from the light-receiving section 23 can be handled as a signal discretized based, for example, on a peak voltage. A circuit detecting the peak voltage or integral value of the light-receiving signal can be used to count the number of photons in integer units from the output of the circuit and output a digital signal based on the counted number of photons.

It should be noted that the breakdown voltage is, for example, within the range of 30 to 70 V although it varies, for instance, with the configuration of the light-receiving section 23 (the number of connected light-receiving elements 232). The operating voltage applied from the first power supply circuit 25 to the light-receiving section 23 is obtained, for example, by adding the breakdown voltage to an overvoltage. Meanwhile, the standby voltage applied from the second power supply circuit 26 to the light-receiving section 23 is obtained, for example, by subtracting the overvoltage from the breakdown voltage. The overvoltage is set, for example, to several volts.

[Distance Measurement Error and Others]

Now, with reference to FIGS. 6A to 6E, for example, a distance measurement error that may occur in the distance measurement device 1 having the above-described configuration will be described. In FIGS. 6A to 6E, the horizontal axis represents time, and the vertical axis represents the voltage level (signal intensity) of the light-receiving signal of the light-receiving section 23 including a SPAD. FIGS. 6A to 6E schematically depict the waveform of the light-receiving signal. Further, in FIGS. 6A to 6E, a time point Ta indicates a time point at which the light-emitting section 22 emits the standard pulsed light SP. It should be noted that the light-receiving signal depicted in the present example is assumed to be a signal obtained after an amplification process is performed by the amplifier section 24a of the light-receiving section 23. Moreover, it is also assumed that the light-receiving section 23 is connected to the first power supply circuit 25, and that the operating voltage is applied to the light-receiving section 23.

Figure 6A:
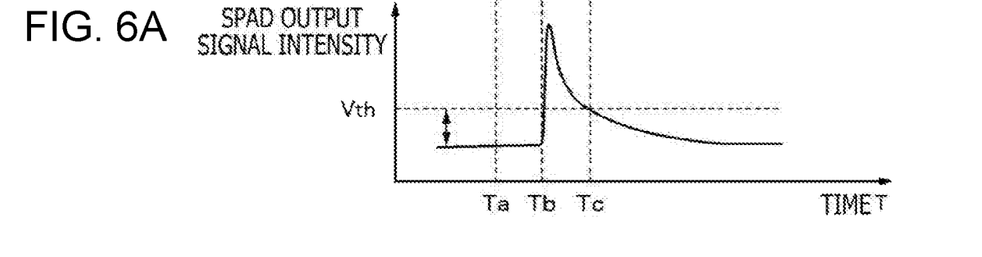
FIGS. 6A to 6E are diagrams illustrating, for example, a distance measurement error that may occur in the distance measurement device.

FIG. 6A illustrates a case where the measurement target MT is located at a relatively short distance (e.g., approximately 10 cm to 1 m) from the distance measurement device 1. The reflected pulsed light RP reflected from the measurement target MT enters the light-receiving section 23. The measurement section 24b then measures a light-receiving time point Tb, which is the time point at which the threshold value $V_{th}$ is exceeded by the level of the light-receiving signal. The calculation section 24c calculates the difference between the time points, that is, Tb minus Ta, and multiplies the result of calculation by the speed of light c and ½ to calculate the distance to the measurement target MT.

Figure 6B:
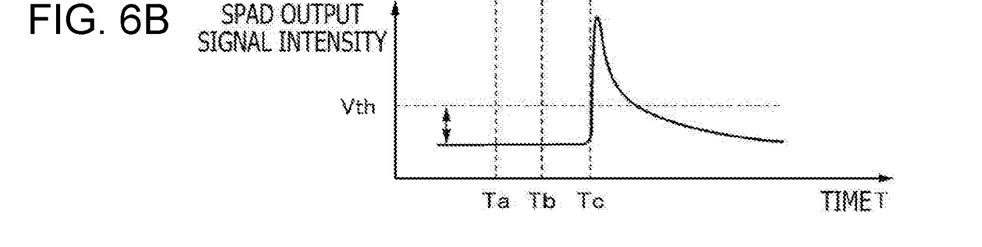

FIG. 6B illustrates a case where the measurement target MT is located at a relatively long distance from the distance measurement device 1. The reflected pulsed light RP reflected from the measurement target MT enters the light-receiving section 23. The measurement section 24b then measures a light-receiving time point Tc, which is the time point at which the threshold value $V_{th}$ is exceeded by the light-receiving section 23. It should be noted that the example of FIG. 6B represents a case where the measurement target MT is located at a relatively long distance from the distance measurement device 1. Therefore, the light-receiving time point Tc is later than the light-receiving time point Tb. The calculation section 24c calculates the difference between the time points, that is, Tc minus Ta, and multiplies the result of calculation by the speed of light c and ½ to calculate the distance to the measurement target MT.

Figure 6C:
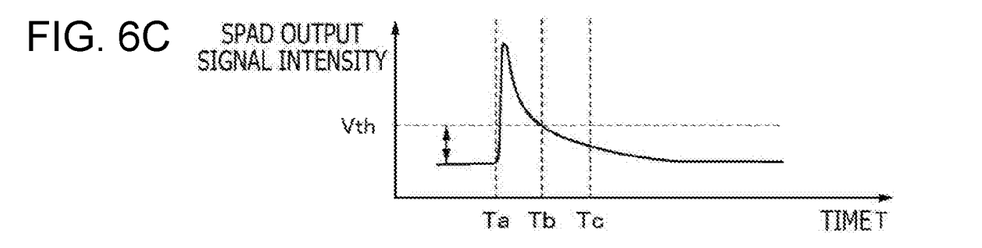

Incidentally, the optical window 11 of the distance measurement device 1 may be soiled in some cases, for example, by stain, rubbish, and scratches (hereinafter generically referred to as the soil etc.). If the standard pulsed light SP passes through a soiled surface of the optical window 11 during the distance measurement by the distance measurement device 1, the light partly scatters as scattered stray light SL and enters the light-receiving section 23 through the optical path for reflected light detection. FIG. 6C illustrates an example of the light-receiving signal from the light-receiving section 23 in the above case. Immediately after the standard pulsed light SP is emitted from the light-emitting section 22, the scattered stray light SL enters the light-receiving section 23.

In the present example, the operating voltage is applied to the light-receiving section 23. Therefore, when the scattered stray light SL enters the light-receiving section 23, the avalanche phenomenon occurs so that the light-receiving section 23 outputs the light-receiving signal. Subsequently, the dead period begins so that the level of the light-receiving signal exponentially decreases.

Figure 6D:
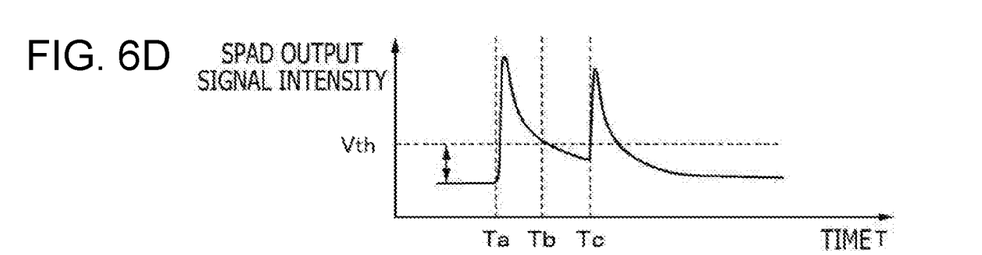

If, as illustrated in FIG. 6D, the measurement target MT is located at a relatively long distance and the reflected pulsed light RP reflected from the measurement target MT enters the light-receiving section 23 after the dead period, that is, after the level of the light-receiving signal decreases below the threshold value $V_{th}$ due to scattered stray light SL, the distance to the measurement target MT can be properly calculated as is the case depicted in FIG. 6B.

Figure 6E:
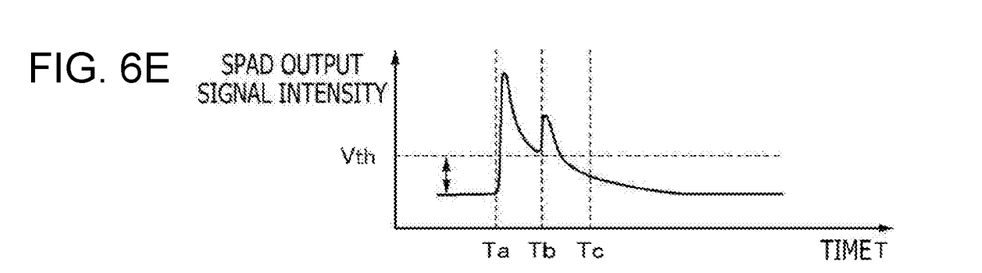

However, as illustrated in FIG. 6E, even if the reflected pulsed light RP from the measurement target MT located at a distance (e.g., approximately 10 cm to 1 m) equivalent to the dead period enters the light-receiving section 23 within the dead period, a proper light-receiving signal is not acquired from the light-receiving section 23. That is, the level of the light-receiving signal varies within the range of a level not lower than the threshold value $V_{th}$ so that a light-receiving time point at which the threshold value $V_{th}$ is exceeded by the level of the light-receiving signal generated as a result of reception of the reflected pulsed light RP cannot be detected. This makes it difficult to properly calculate the distance to the measurement target MT. It should be noted that the light-receiving section 23 may output a low-level signal in response to incident reflected pulsed light RP, as illustrated in FIG. 6E, although the avalanche phenomenon does not occur even within the dead period. In such a case, too, it is difficult to properly measure the distance to the measurement target MT for the above-mentioned reason.

As described above, the soil etc. attached to the optical window 11 may cause a problem in which the distance, for example, to the measurement target MT located at a short distance from the distance measurement device 1 cannot be detected or a problem in which a significant detection error occurs. Exemplary operations of the distance measurement device 1, which is able to address the above problems, are described below.

[Exemplary Operations of Distance Measurement Device]

Figure 7:
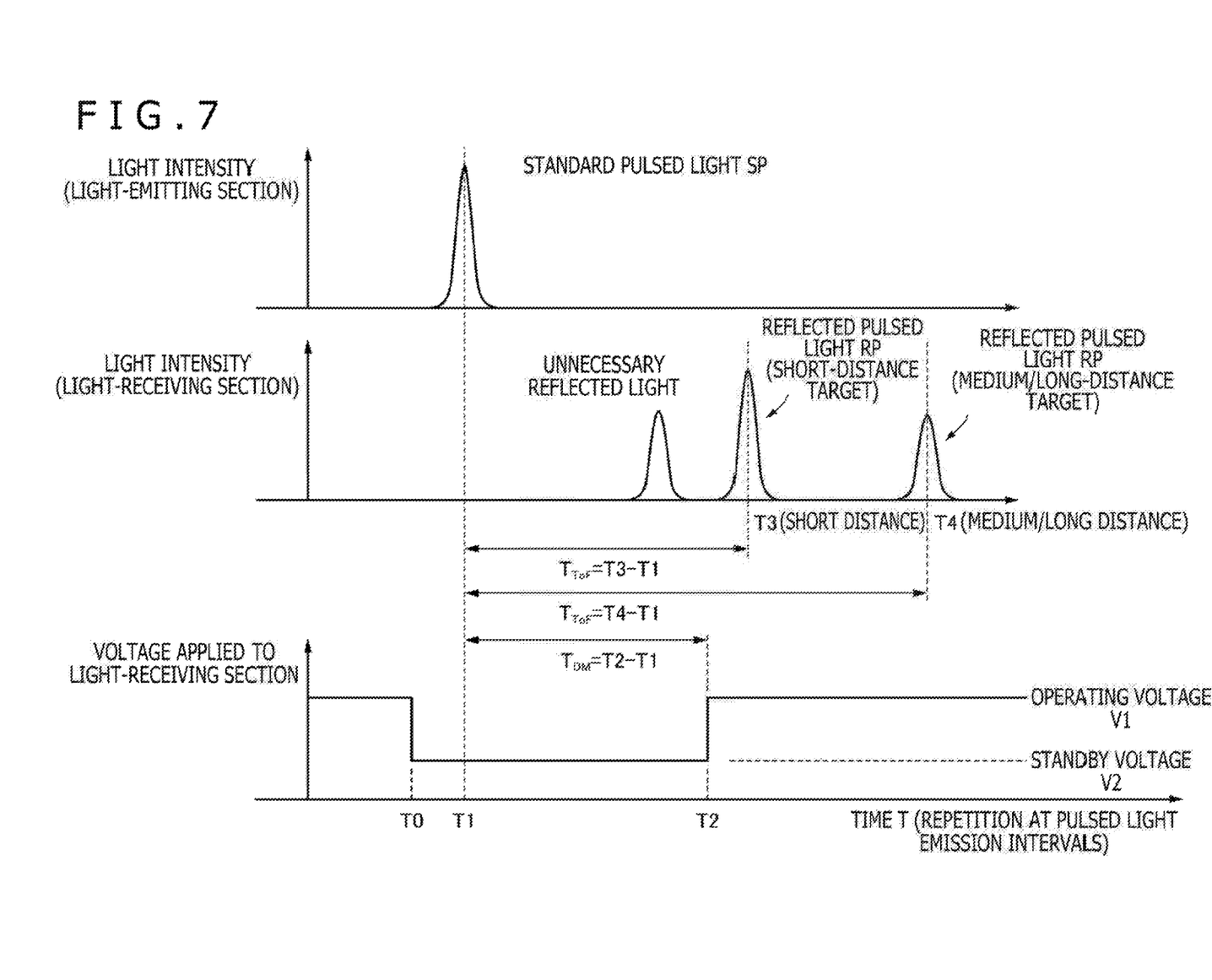
FIG. 7 is a diagram illustrating exemplary operations of the distance measurement device according to an embodiment of the present disclosure.

FIG. 7 is a diagram illustrating the exemplary operations of the distance measurement device 1. The control section 21 executes control, for example, to drive the light-emitting section 22 at a time point T1. It should be noted that the control section 21 in the present embodiment repeatedly drives the light-emitting section 22 at fixed intervals as described earlier. At least at the time point T1 at which the light-emitting section 22 operates, the control section 21 controls the switching circuit 27 so that the switch is connected to the contact 27b. This causes the standby voltage V2 to be applied to the light-receiving section 23. It should be noted that, in consideration, for example, of a delayed switching operation, the present embodiment may execute switching control at a time point T0 earlier than the time point T1. However, switching control may alternatively be executed at the time point T1.

At least during a period (hereinafter referred to, as appropriate, as the non-operating period $T_{DM}$) from the time point T1 to a time point T2, which is later than the time point T1 by a predetermined length of time, the control section 21 executes control to apply the standby voltage V2 to the light-receiving section 23. That is, the control section 21 executes control so that the switch is connected to the contact 27b during the non-operating period $T_{DM}$. The non-operating period $T_{DM}$ is set based on a predetermined distance. The predetermined distance is, for example, the optical distance (optical path length) between the light-emitting section 22 and the optical window 11. The non-operating period $T_{DM}$ may be set to the approximate length of time that is calculated by dividing twice the optical distance by the speed of light c. This ensures that distance measurements are correctly made by preventing the avalanche phenomenon from occurring even if the scattered stray light SL enters the light-receiving section 23 due to the soil etc. on the optical window 11.

The predetermined distance may be the shortest distance measurable by the distance measurement device 1 or the shortest measurable distance set in the distance measurement device 1. If, for example, the shortest measurable distance is 15 cm, a time of approximately 1 ns is required for the light-receiving section 23 to receive the reflected pulsed light RP from the measurement target MT located at such a distance. That is, light that may enter the light-receiving section 23 earlier can be regarded as the scattered stray light SL. Therefore, the above-mentioned period of approximately 1 ns may be regarded as the non-operating period $T_{DM}$. Based on the above considerations, as a concrete example, the non-operating period $T_{DM}$ is set within the range of 0.5 to 2 ns.

At the time point T2 at which the non-operating period $T_{DM}$ ends, the control section 21 controls the switching circuit 27 so that the switch is connected to the contact 27a. This causes an operating voltage V1 to be applied to the light-receiving section 23. Subsequently, the reflected pulsed light RP from the measurement target MT enters the light-receiving section 23 so that the light-receiving section 23 outputs the light-receiving signal. The light-receiving signal from the light-receiving section 23 is supplied to the signal processing section 24. After the light-receiving signal is amplified by the amplifier section 24a, the measurement section 24b measures the light-receiving time point. FIG. 7 illustrates a light-receiving time point T3 and a light-receiving time point T4. The light-receiving time point T3 is related to a case where the measurement target MT is located at a short distance from the distance measurement device 1. The light-receiving time point T4 is related to a case where the measurement target MT is located at a medium or long distance from the distance measurement device 1.

The calculation section 24c calculates the time of flight $T_{TOF}$ of the standard pulsed light SP by determining, for example, the difference between the time point T1 and the light-receiving time point T3 (or the light-receiving time point T4). The calculation section 24c then calculates the distance to the measurement target MT by multiplying the time of flight $T_{TOF}$ by the light of speed c and ½. It should be noted that, although not depicted, distance data indicative of the calculated distance to the measurement target MT is transmitted to an additional device and used in a manner appropriate for an application in the additional device.

Subsequently, the control section 21 executes switching control immediately before the time point T1 for the next light emission cycle (at the time point T0) in order to change the switch destination from the contact 27a to the contact 27b. This causes the standby voltage V2 to be applied to the light-receiving section 23.

The above-described embodiment is configured so that the standby voltage is applied to the light-receiving section instead of the operating voltage during a period when scattered stray light may enter the light-receiving section. This prevents incident scattered stray light SL from causing the light-receiving section to output an unnecessary light-receiving signal before a period when measurements should be made. Further, the distance to a measurement target located at a short distance can be properly made to improve the accuracy of distance measurement.

2. Modification Examples

While embodiments of the present disclosure have been described in detail, it should be understood that the present disclosure is not limited to the foregoing embodiments, and that various modifications can be made based on the technical idea of the present disclosure.

The distance measurement device according to the present disclosure may alternatively be built in various apparatuses for use instead of being used as a standalone device. The distance measurement device may be built, for example, in a projector device. In such an instance, the distance measurement device may be adapted to identify surface irregularities on a wall surface used as a projection plane in order to measure the distance to each relevant point of the wall surface. In accordance with the identified wall surface irregularities, the whole or part of image data regarding a projection image may be subjected to a correction process (e.g., contrast improvement or color tone improvement process). Further, the distance measurement device according to the present disclosure is also applicable to various electronic apparatuses such as gaming machines, imaging devices, smartphones, mobile phones, and personal computers.

The distance measurement device according to the present disclosure is also applicable to safety devices that detect the distance, for example, to a pedestrian or an obstacle and apply a brake in accordance with the detected distance. That is, the distance measurement device according to the present disclosure is applicable to automobiles, electric trains, airplanes, helicopters, small aircraft, and other movable objects that may use the above-mentioned safety devices. Further, the distance measurement device according to the present disclosure is applicable to robots (e.g., service robots, disaster relief robots, and cleaning robots) and security devices.

If the distance measurement device is to be built in an additional device, the distance measurement device may have the same configuration as the additional device. If, for example, the distance measurement device is applied to an automobile, a part of a battery of the automobile may be used as a power supply circuit, and an LED (Light Emitting Diode) or other headlight of the automobile may be used as the light-emitting section.

The foregoing embodiment has been described on the assumption that the distance measurement device includes two power supply circuits. However, the present disclosure is not limited to such a configuration. For example, the distance measurement device may include only one power supply circuit for applying the operating voltage to the light-receiving section. In a case where such an alternative configuration is adopted, control is executed in such a manner that the light-receiving section is not connected to the power supply circuit (no voltage is applied to the light-receiving section) during the non-operating period.

In a case where a SPAD is used as the light-receiving section, the sensitivity of the light-receiving section varies with the magnitude of the overvoltage. In general, when the overvoltage increases, the output current of each detected photon increases as compared with a noise component such as a dark current. This increases the sensitivity of the light-receiving section. The distance measurement device may include a plurality of power supply circuits that differ in the overvoltage of the operating voltage. Then, the sensitivity of the light-receiving section may be changed by selecting one of the power supply circuits so as to apply the operating voltage based on application requirements.

The above-described configuration of the distance measurement device may be changed as needed. For example, the distance measurement device may include at least either one of the light-receiving and light-emitting sections. Further, the distance measurement device may include the signal processing section, the first power supply circuit, the second power supply circuit, and the switching circuit. Furthermore, a part of the function of the signal processing section (e.g., the function of the calculation section) may be incorporated into an additional device different from the distance measurement device in order to let the additional device perform a process of calculating the distance to the measurement target.

In a case where the distance measurement device according to the above-described embodiment is built in an additional device for use, the housing need not always be provided to the distance measurement device. The light-receiving element included in the light-receiving section is not limited to a SPAD. For example, a different light-receiving element having a dead period may be applied as the light-receiving section. The number of SPADs applied to the light-receiving section and their connection form may be changed as needed. The quenching resistor to be connected to the SPAD is not limited to a resistor. A different circuit element, such as a transistor, may be connected to the SPAD. The measurement section is not limited to the TDC. The measurement section may be, for example, a CFD (Constant Fraction Discriminator) that detects a zero cross point by adding an attenuated waveform of a predetermined waveform to a waveform obtained by delaying and inverting the predetermined waveform. The beam splitter may be substituted, for example, by a half mirror. In the above-described embodiment, the signal processing section may be inoperative during the non-operating period or a period when the standby voltage is applied to the light-receiving section. That is, processes such as the amplification process, the light-receiving time point measurement process, and the distance calculation process may need not always to be performed.

The distance measurement device may perform a process of confirming whether scattered stray light is generated due, for instance, to the soil etc. on the optical window. For example, when the distance measurement device or a device incorporating the distance measurement device starts up, the light-emitting section may emit a standard pulse with the operating voltage applied to the light-receiving section in order to let the control section determine whether scattered stray light enters the light-receiving section during a period equivalent to the non-operating period. Subsequently, if scattered stray light enters the light-receiving section, the process described in conjunction with the foregoing embodiment may be performed. If, by contrast, scattered stray light does not enter the light-receiving section, the optical window may be determined to be not soiled to affect distance measurements so that, for example, a process of constantly applying the operating voltage to the light-receiving section is performed.

For example, the configurations, methods, processes, shapes, materials, and numerical values mentioned in conjunction with the above-described embodiment are merely exemplary, and different configurations, methods, processes, shapes, materials, and numerical values may alternatively be used as needed. Further, the present disclosure may be implemented, for example, by a device, a method, and a system including a plurality of devices, and the elements described in conjunction with the foregoing embodiment and modification examples may be combined as far as no technical contradiction occurs.

It should be noted that the present disclosure may adopt the following configurations.

(1)

There is provided a distance measurement device including a control section. The control section executes control so that an operating voltage for operating a light-receiving section is applied to the light-receiving section at a second time point. The second time point is later than a first time point by a predetermined time. The first time point is a time point at which a light-emitting section operates.

(2)

The distance measurement device as described in (1) above is configured so that the predetermined time is set based on a predetermined distance.

(3)

The distance measurement device as described in (2) above is configured so that the predetermined distance is a shortest measurable distance or a distance between the light-emitting section and an optical window.

(4)

The distance measurement device as described in any one of (1) to (3) above is configured so that the predetermined time is within the range of 0.5 to 2 ns.

(5)

The distance measurement device as described in any one of (1) to (4) above further includes at least a first power circuit and a second power supply circuit and additionally includes a switching section. The first power supply circuit applies the operating voltage to the light-receiving section. The second power supply circuit applies a standby voltage to the light-receiving section. The standby voltage is lower than the operating voltage. The switching section switches between the first power supply circuit and the second power supply circuit. The control section controls the switching section to switch from the second power supply circuit to the first power supply circuit at the second time point.

(6)

The distance measurement device as described in (5) above is configured so that the control section controls the switching section to switch from the first power supply circuit to the second power supply circuit at the first time point or earlier.

(7)

The distance measurement device as described in any one of (1) to (6) above further includes a calculation section. Based on the first time point and a third time point, the calculation section calculates a distance to a measurement target. The third time point is a time point at which standard light emitted from the light-emitting section and reflected from the measurement target is received.

(8)

The distance measurement device as described in (7) above is configured so that the calculation section does not perform a process of calculating a distance during a period when the standby voltage is applied to the light-receiving section.

(9)

The distance measurement device as described in any one of (1) to (8) above includes at least either one of the light-receiving section and the light-emitting section.

(10)

The distance measurement device as described in any one of (1) to (8) above includes the light-receiving section that includes a SPAD.

(11)

There is provided a distance measurement method including the step of applying, by a control section, an operating voltage for operating a light-receiving section to the light-receiving section at a second time point. The second time point is later than a first time point by a predetermined time. The first time point is a time point at which a light-emitting section operates.

3. Application Examples

A technology according to the present disclosure is applicable to various products. The technology according to the present disclosure may be implemented as a device that is to be mounted in one of various types of movable objects such as automobiles, electric automobiles, hybrid electric automobiles, motorcycles, bicycles, personal mobility devices, airplanes, drones, ships, robots, construction machines, and agricultural machines (tractors).

Figure 8:
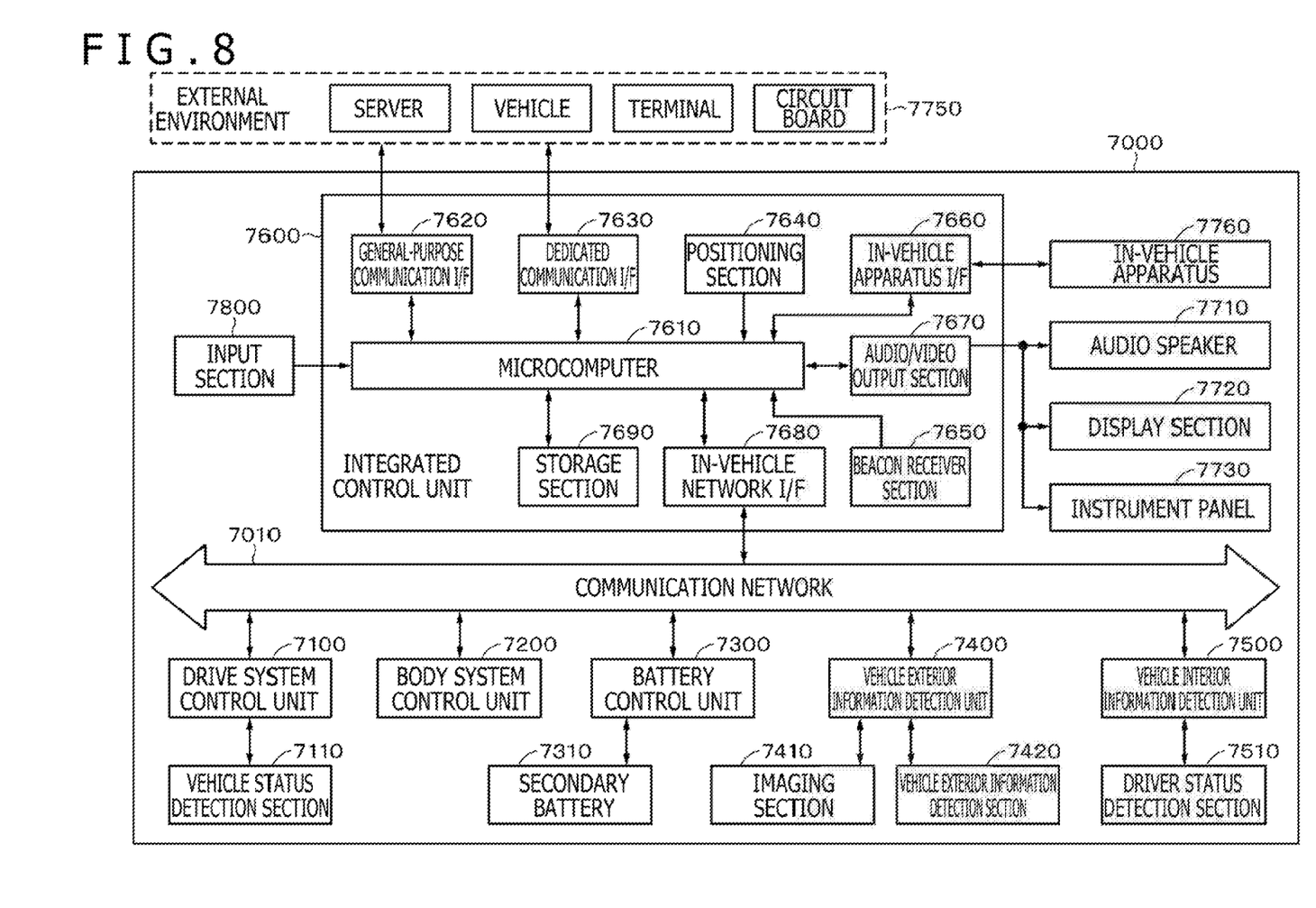
FIG. 8 is a block diagram illustrating an exemplary schematic configuration of a vehicle control system according to an application example.

FIG. 8 is a block diagram illustrating an exemplary schematic configuration of a vehicle control system 7000 that is an example of a mobile object control system to which the technology according to the present disclosure is applied. The vehicle control system 7000 includes a plurality of electronic control units connected through a communication network 7010. In the example of FIG. 8, the vehicle control system 7000 includes a drive system control unit 7100, a body system control unit 7200, a battery control unit 7300, a vehicle exterior information detection unit 7400, a vehicle interior information detection unit 7500, and an integrated control unit 7600. The communication network 7010 for connecting the above-mentioned control units may be an in-vehicle communication network compliant with a standard such as CAN (Controller Area Network), LIN (Local Interconnect Network), LAN (Local Area Network), or FlexRay (registered trademark).

The control units each include a microcomputer, a storage section, and a drive circuit. The microcomputer performs arithmetic processing in accordance with various programs. The storage section stores, for example, programs to be executed by the microcomputer or parameters used for various computations. The drive circuit drives a device that is to be variously controlled. Each control unit further includes a network I/F and a communication I/F. The network I/F is used to communicate with another control unit through the communication network 7010. The communication I/F is used to establish wired or wireless communication, for example, with a device inside or outside a vehicle or with a sensor. As functional elements of the integrated control unit 7600, FIG. 8 depicts a microcomputer 7610, a general-purpose communication I/F 7620, a dedicated communication I/F 7630, a positioning section 7640, a beacon receiver section 7650, an in-vehicle apparatus I/F 7660, an audio/video output section 7670, an in-vehicle network I/F 7680, and a storage section 7690. The other control units similarly include, for example, a microcomputer, communication I/Fs, and a storage section.

In accordance with various programs, the drive system control unit 7100 controls the operations of devices related to a drive system of the vehicle. The drive system control unit 7100 functions as a control device for controlling, for example, a driving force generation device for generating vehicle driving force, for example, of an internal combustion engine or a driving electric motor, a driving force transmission mechanism for transmitting the driving force to wheels, a steering mechanism for adjusting the steering angle of the vehicle, and a braking device for generating vehicle braking force. The drive system control unit 7100 may have the function of a control device, for example, for an ABS (Antilock Brake System) or ESC (Electronic Stability Control).

A vehicle status detection section 7110 is connected to the drive system control unit 7100. For example, the vehicle status detection section 7110 includes at least one of a gyro sensor for detecting the angular velocity of axis rotational motion of a vehicle body, an acceleration sensor for detecting the acceleration of the vehicle, and a sensor for detecting, for example, an accelerator pedal operation amount, a brake pedal operation amount, a steering wheel steering angle, an engine rotation speed, or a wheel rotation speed. The drive system control unit 7100 performs arithmetic processing by using signals inputted from the vehicle status detection section 7110, and controls, for example, an internal combustion engine, a driving electric motor, an electric power steering device, or a braking device.

In accordance with various programs, the body system control unit 7200 controls the operations of various devices mounted in the vehicle body. The body system control unit 7200 functions as a control device for controlling, for example, a keyless entry system, a smart key system, a power window device, or various lights such as headlights, back-up lights, brake lights, blinkers, or fog lights. In this instance, radio waves or various switch signals emitted from a mobile device used as a substitute for a key may be inputted to the body system control unit 7200. Upon receiving the input of a radio wave or a signal, the body system control unit 7200 controls, for example, a vehicle door lock device, a power window device, or lights.

In accordance with various programs, the battery control unit 7300 controls a secondary battery 7310 that acts as a power supply source for the driving electric motor. For example, signals indicative of a battery temperature, a battery output voltage, or a remaining battery capacity are inputted to the battery control unit 7300 from a battery device having the secondary battery 7310. The battery control unit 7300 performs arithmetic processing by using the above signals, and controls, for example, the temperature of the secondary battery 7310 or a cooling device provided for the battery device.

The vehicle exterior information detection unit 7400 detects information regarding the outside of a vehicle in which the vehicle control system 7000 is mounted. For example, at least either one of an imaging section 7410 and a vehicle exterior information detection section 7420 is connected to the vehicle exterior information detection unit 7400. The imaging section 7410 includes at least one of a ToF (Time Of Flight) camera, a stereo camera, a monocular camera, an infrared camera, or a different camera. The vehicle exterior information detection section 7420 includes at least either one of an environment sensor and a peripheral information detection sensor. The environment sensor detects current weather or atmospheric phenomena. The peripheral information detection sensor detects, for example, obstacles, pedestrians, or other vehicles around a vehicle in which the vehicle control system 7000 is mounted.

The environment sensor may be, for example, at least one of a raindrop sensor for detecting rainy weather, a fog sensor for detecting fog, a sunlight sensor for detecting the degree of sunlight, or a snowfall sensor for detecting snowfall. The peripheral information detection sensor may be at least one of an ultrasonic sensor, a radar device, or a LIDAR (Light Detection and Ranging, Laser Imaging Detection and Ranging) device. The imaging section 7410 and the vehicle exterior information detection section 7420 may be provided as an independent sensor or device or provided as a device into which a plurality of sensors or devices are integrated.

Figure 9:
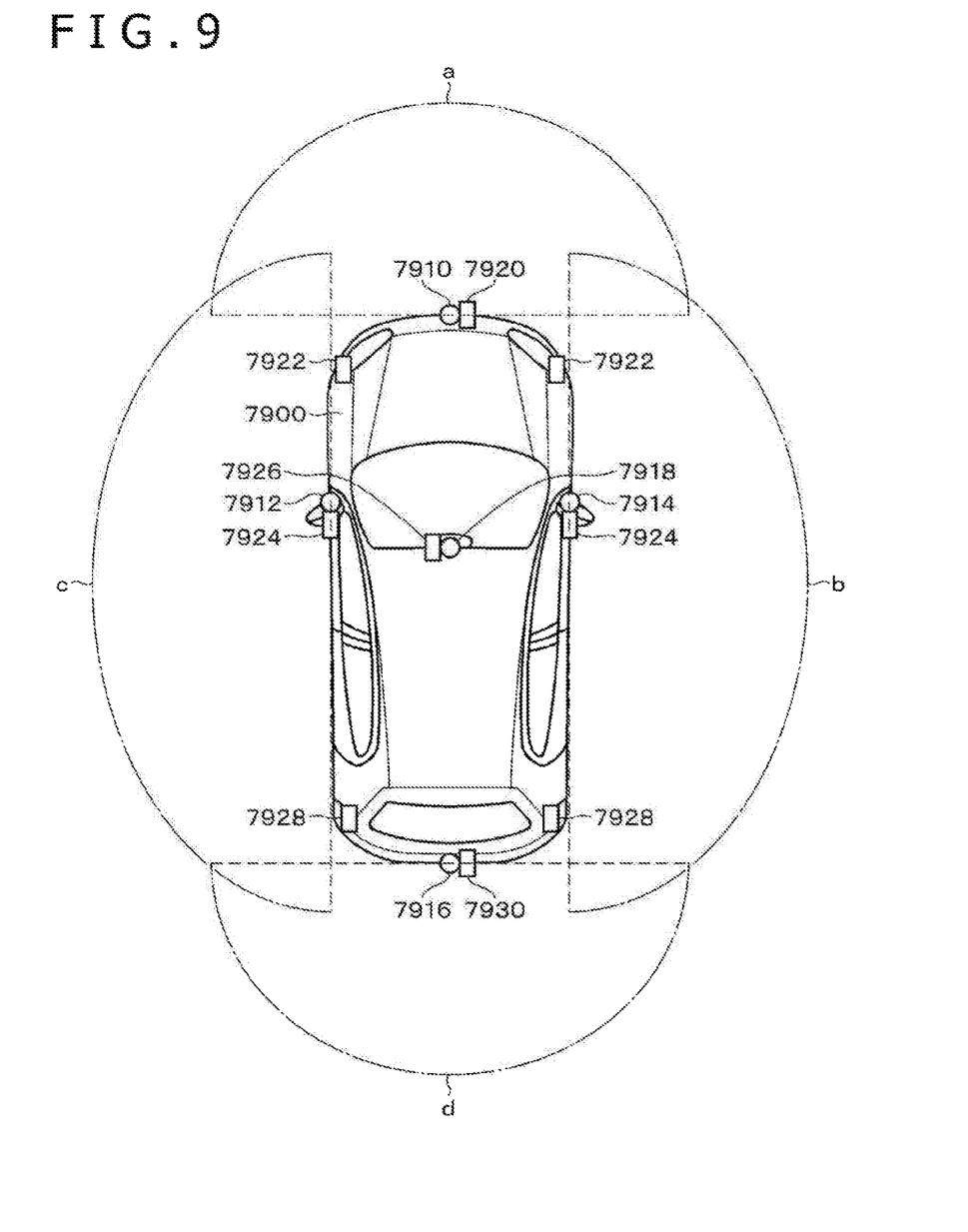
FIG. 9 is a diagram illustrating exemplary installation positions of a vehicle exterior information detection section and imaging section according to an application example.

In this context, FIG. 9 illustrates exemplary installation positions of the imaging section 7410 and the vehicle exterior information detection section 7420. Imaging sections 7910, 7912, 7914, 7916 and 7918 are disposed, for example, at least one position of the front nose, side mirrors, rear bumper, rear door of a vehicle 7900, or an upper part of a windshield of the inside of the vehicle 7900. The imaging section 7910 disposed on the front nose and the imaging section 7918 disposed on the upper part of the windshield of the inside of the vehicle mainly acquire a front view image of the vehicle 7900. The imaging sections 7912, 7914 disposed on the side mirrors mainly acquire a side view image of the vehicle 7900. The imaging section 7916 disposed on the rear bumper or the rear door mainly acquires a rear view image of the vehicle 7900. The imaging section 7918 disposed on the upper part of the windshield the inside of the vehicle is mainly used to detect, for example, preceding vehicles, pedestrians, obstacles, traffic lights, traffic signs, or lanes.

It should be noted that FIG. 9 depicts exemplary imaging ranges of the imaging sections 7910, 7912, 7914 and 7916. An imaging range a is the imaging range of the imaging section 7910 disposed on the front nose. Imaging ranges b and c are respectively the imaging ranges of the imaging sections 7912 and 7914 disposed on the side mirrors. An imaging range d is the imaging range of the imaging section 7916 disposed on the rear bumper or the rear door. A bird's-eye view image, that is, an elevated view image depicting the vehicle 7900 from above, is obtained, for example, by superimposing image data captured by the imaging sections 7910, 7912, 7914 and 7916.

Vehicle exterior information detection sections 7920, 7922, 7924, 7926, 7928, 7930 disposed on the front, rear, sides, corners, and on the upper part of the windshield of the inside of the vehicle 7900 may be, for example, ultrasonic sensors or radar devices. The vehicle exterior information detection sections 7920, 7926 and 7930 disposed on the front nose, rear bumper, and rear door of the vehicle 7900 and on the upper part of the windshield of the inside of the vehicle 7900 may be, for example, a LIDAR device. The vehicle exterior information detection sections 7920 to 7930 are mainly used to detect, for example, preceding vehicles, pedestrians, and obstacles.

Returning to FIG. 8, the vehicle exterior information detection unit 7400 allows the imaging section 7410 to capture vehicle exterior images and receives image data associated with the captured images. Further, the vehicle exterior information detection unit 7400 receives detected information from the connected vehicle exterior information detection section 7420. If the vehicle exterior information detection section 7420 is an ultrasonic sensor or a LIDAR device, the vehicle exterior information detection unit 7400 transmits, for example, ultrasonic waves or electromagnetic waves, receives reflected waves, and acquires information carried by the received reflected waves. In accordance with the acquired information, the vehicle exterior information detection unit 7400 may perform an object detection process or a distance detection process with respect, for example, to persons, vehicles, obstacles, traffic signs, or markings on a road surface. The vehicle exterior information detection unit 7400 may perform an environment recognition process of recognizing, for example, rainfall, fog, or road surface conditions in accordance with the acquired information. The vehicle exterior information detection unit 7400 may calculate the distance to an object outside the vehicle in accordance with the acquired information.

Further, in accordance with the received image data, the vehicle exterior information detection unit 7400 may perform an image recognition process or a distance detection process with respect, for example, to persons, vehicles, obstacles, traffic signs, or markings on a road surface. The vehicle exterior information detection unit 7400 may perform, for example, a distortion correction or alignment process on the received image data and combine image data captured by different imaging sections in the imaging section 7410 in order to generate a bird's eye view image or a panoramic image. The vehicle exterior information detection unit 7400 may perform a viewpoint conversion process by using image data captured by different imaging sections in the imaging section 7410.

The vehicle interior information detection unit 7500 detects information regarding the interior of the vehicle. The vehicle interior information detection unit 7500 is connected, for example, to a driver status detection section 7510 that detects the status of the driver. The driver status detection section 7510 may include, for example, a camera for capturing an image of the driver, a biosensor for detecting biological information regarding the driver, or a microphone for collecting voice in a vehicle compartment. The biosensor is disposed, for example, on a seat or a steering wheel in order to detect biological information regarding a passenger seated on a seat or the driver holding the steering wheel. Based on the detected information inputted from the driver status detection section 7510, the vehicle interior information detection unit 7500 may calculate the degree of fatigue or concentration of the driver or determine whether the driver is dozing. The vehicle interior information detection unit 7500 may perform, for example, a noise cancellation process on a collected voice signal.

The integrated control unit 7600 exercises overall control over operations in the vehicle control system 7000 in accordance with various programs. The integrated control unit 7600 is connected to an input section 7800. The input section 7800 is implemented by a touch panel, a button, a microphone, a switch, a lever, or other input device operable by a passenger. Data obtained by recognizing voice inputted from the microphone may be inputted to the integrated control unit 7600. The input section 7800 may be, for example, a remote control device that uses infrared waves or radio waves, or a mobile phone, a PDA (Personal Digital Assistant), or other externally connected apparatus that is compatible with the operations of the vehicle control system 7000. The input section 7800 may be, for example, a camera. In a case where a camera is used as the input section 7800, a passenger can input information by making a gesture. Alternatively, data obtained by detecting the motion of a wearable device worn by a passenger may be inputted.

Further, the input section 7800 may include, for example, an input control circuit that generates an input signal based on information inputted, for instance, by a passenger through the input section 7800 and outputs the generated input signal to the integrated control unit 7600. For example, a passenger operates the input section 7800 in such a manner as to input various data to the vehicle control system 7000 or designate a processing operation.

The storage section 7690 may include a ROM (Read Only Memory) for storing various programs to be executed by the microcomputer, and a RAM (Random Access Memory) for storing, for example, various parameters, computation results, or sensor values. Further, the storage section 7690 may be implemented, for example, by an HDD (Hard Disk Drive) or other magnetic storage device, a semiconductor storage device, an optical storage device, or a magneto-optical storage device.

The general-purpose communication I/F 7620 is a general-purpose communication I/F that mediates the communication with various apparatuses existing in an external environment 7750. The general-purpose communication I/F 7620 may incorporate a cellular communication protocol such as GSM (Global System of Mobile communications) (registered trademark), WiMAX, LTE (Long Term Evolution), or LTE-A (LTE-Advanced), or a wireless communication protocol such as wireless LAN (referred to also as Wi-Fi (registered trademark)) or Bluetooth (registered trademark). The general-purpose communication I/F 7620 may be connected through a base station or an access point to an apparatus (e.g., an application server or a control server) existing on an external network (e.g., the Internet, a cloud network, or a business-specific network). Further, the general-purpose communication I/F 7620 may be connected to a terminal existing in the vicinity of the vehicle (e.g., a terminal of the driver, a pedestrian, or a shop or an MTC (Machine Type Communication) terminal) by using, for example, the P2P (Peer To Peer) technology.

The dedicated communication I/F 7630 is a communication I/F that supports a communication protocol formulated for use in a vehicle. The dedicated communication I/F 7630 may incorporate a standard protocol, such as WAVE (Wireless Access in Vehicular Environment), which is a combination of IEEE802.11p, lower layer, and IEE16609, upper layer, DSRC (Dedicated Short Range Communications), or a cellular communication protocol. The dedicated communication I/F 7630 typically establishes V2X communication, which is a concept including at least one of Vehicle to Vehicle communication, Vehicle to Infrastructure communication, Vehicle to Home communication, and Vehicle to Pedestrian communication.

The positioning section 7640 executes positioning upon receiving, for example, a GNSS signal from a GNSS (Global Navigation Satellite System) satellite (e.g., a GPS (Global Positioning System) signal from a GPS satellite), and generates location information including the latitude, longitude, and altitude of the vehicle. It should be noted that the positioning section 7640 may identify the current location by exchanging signals with a wireless access point or acquire the location information from a mobile phone, a PHS, a smartphone, or other terminal having a positioning function.

The beacon receiver section 7650 receives, for example, radio waves or electromagnetic waves emitted, for example, from a radio station installed on a road in order to acquire information regarding, for example, the current location, traffic jams, closed roads, and the time required. It should be noted that the function of the beacon receiver section 7650 may be incorporated in the above-described dedicated communication I/F 7630.

The in-vehicle apparatus I/F 7660 is a communication interface that mediates the connection between the microcomputer 7610 and various in-vehicle apparatuses 7760 existing in the vehicle. The in-vehicle apparatuses 7760 may establish a wireless connection by using a wireless communication protocol such as wireless LAN, Bluetooth (registered trademark), NFC (Near Field Communication), or WUSB (Wireless USB). Further, the in-vehicle apparatus I/F 7660 may establish a wired connection, such as a USB (Universal Serial Bus) connection, an HDMI (High-Definition Multimedia Interface) (registered trademark) connection, or an MHL (Mobile High-definition Link) connection, through an undepicted connection terminal (and, if necessary, a cable). The in-vehicle apparatuses 7760 may include, for example, at least one of a mobile, wearable apparatus owned by a passenger, or an information apparatus carried into or mounted in the vehicle. Further, the in-vehicle apparatuses 7760 may include a navigation device that searches for a route to a desired destination. The in-vehicle apparatus I/F 7660 exchanges control signals or data signals with the in-vehicle apparatuses 7760.

The in-vehicle network I/F 7680 is an interface that mediates the communication between the microcomputer 7610 and the communication network 7010. The in-vehicle network I/F 7680 transmits and receives, for example, signals in compliance with a predetermined protocol supported by the communication network 7010.

Based on information acquired through at least one of the general-purpose communication I/F 7620, the dedicated communication I/F 7630, the positioning section 7640, the beacon receiver section 7650, the in-vehicle apparatus I/F 7660, or the in-vehicle network I/F 7680, the microcomputer 7610 in the integrated control unit 7600 controls the vehicle control system 7000 in accordance with various programs. For example, based on acquired vehicle interior and vehicle exterior information, the microcomputer 7610 may calculate a control target value for the driving force generation device, the steering mechanism, or the braking device, and output a control command to the drive system control unit 7100. For example, the microcomputer 7610 may exercise cooperative control to implement the functions of an ADAS (Advanced Driver Assistance System) including, for example, vehicle collision avoidance or impact mitigation, follow-up running, fixed vehicle speed running, or vehicle collision warning based on inter-vehicle distance, or vehicle lane departure warning. Further, the microcomputer 7610 may exercise cooperative control to provide, for example, automatic driving for achieving autonomous driving without a driver's intervention by controlling, for instance, the driving force generation device, the steering mechanism, or the braking device in accordance with acquired vehicle peripheral information.

Based on information acquired through at least one of the general-purpose communication I/F 7620, the dedicated communication I/F 7630, the positioning section 7640, the beacon receiver section 7650, the in-vehicle apparatus I/F 7660, or the in-vehicle network I/F 7680, the microcomputer 7610 may generate three-dimensional distance information between the vehicle and an object such as a peripheral structure or a person, and generate local map information including peripheral information regarding the current vehicle location. Further, based on the acquired information, the microcomputer 7610 may predict the risk, for example, of causing a vehicle collision, approaching a pedestrian, or entering a closed road, and generate a warning signal. The warning signal may be, for example, a signal for emitting a warning sound or illuminating a warning lamp.

The audio/video output section 7670 transmits at least one of an audio output signal or a video output signal to an output device that is capable of conveying visual or auditory information to a passenger in the vehicle or to the outside of the vehicle. In the example of FIG. 8, an audio speaker 7710, a display section 7720, and an instrument panel 7730 are illustrated as the output device. The display section 7720 may include at least one of an on-board display or a head-up display. The display section 7720 may have an AR (Augmented Reality) display function. The output device may be, for example, a headphone, a wearable device such as a glasses-type display worn by a passenger, a projector, a lamp, or one of the aforementioned devices. In a case where a display device is used as the output device, the display device visually displays results derived from various processes performed by the microcomputer 7610 or information received from a different control unit in various formats such as text, images, tables, and graphs. Further, in a case where an audio output device is used as the output device, the audio output device converts an audio signal, which includes, for example, reproduced audio data or acoustic data, to an analog signal, and audibly outputs the analog signal.

It should be noted that at least two control units connected through the communication network 7010 in the example of FIG. 8 may be integrated as a single control unit. Alternatively, the individual control units may each include a plurality of control units. Further, the vehicle control system 7000 may include an additional control unit that is not depicted. Furthermore, the function of a certain control unit, which is described above, may be partly or wholly incorporated into a different control unit. That is, if information is transmitted and received through the communication network 7010, predetermined arithmetic processing may be performed by any control unit. Similarly, a sensor or a device connected to a certain control unit may be connected to a different control unit, and a plurality of control units may mutually transmit and receive detected information through the communication network 7010.

It should be noted that, for example, the configuration and functions of the distance measurement device, which are described in conjunction with the foregoing embodiment and exemplary modifications, are applicable, for example, to the vehicle exterior information detection unit 7400.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST

1 . . . Distance measurement device
21 . . . Control section
22 . . . Light-emitting section
23 . . . Light-receiving section
24 . . . Signal processing section
24b . . . Measurement section
24c . . . Calculation section
25 . . . First power supply circuit
26 . . . Second power supply circuit
27 . . . Switching circuit
MT . . . Measurement target

The invention claimed is:

1. A distance measurement device comprising:
a control section that executes control so that an operating voltage for operating a light-receiving section is applied to the light-receiving section at a second time point, the second time point being later than a first time point by a predetermined time, the first time point being a time point at which a light-emitting section operates, and executes to determine whether an optical window is soiled,
wherein the predetermined time is set based on a determination that the optical window is soiled and a predetermined distance, which is a distance between the light-emitting section and the soiled optical window.

2. The distance measurement device according to claim 1, wherein the predetermined time is within the range of 0.5 to 2 ns.

3. The distance measurement device according to claim 1, further comprising:
at least a first power circuit and a second power supply circuit, the first power supply circuit applying the operating voltage to the light-receiving section, the second power supply circuit applying a standby voltage to the light-receiving section, the standby voltage being lower than the operating voltage; and
a switching section that switches between the first power supply circuit and the second power supply circuit; wherein
the control section controls the switching section to switch from the second power supply circuit to the first power supply circuit at the second time point.

4. The distance measurement device according to claim 3, wherein the control section controls the switching section to switch from the first power supply circuit to the second power supply circuit at the first time point or earlier.

5. The distance measurement device according to claim 1, further comprising:
a calculation section that, based on the first time point and a third time point, calculates a distance to a measurement target, the third time point being a time point at which standard light emitted from the light-emitting section and reflected from the measurement target is received.

6. The distance measurement device according to claim 5, wherein the calculation section does not perform a process of calculating a distance during a period when a standby voltage is applied to the light-receiving section.

7. The distance measurement device according to claim 1, further comprising:
at least one of the light-receiving section and the light-emitting section.

8. The distance measurement device according to claim 1, further comprising:
the light-receiving section, wherein the light receiving section includes a SPAD.

9. A distance measurement method comprising:
applying, by a control section, an operating voltage for operating a light-receiving section to the light-receiving section at a second time point, the second time point being later than a first time point by a predetermined time, the first time point being a time point at which a light-emitting section operates, and
determining whether an optical window is soiled,
wherein the predetermined time is set based on a determination that the optical window is soiled and a predetermined distance, which is a distance between the light-emitting section and the soiled optical window.

* * * * *